(12) United States Patent
Essers et al.

(10) Patent No.: US 9,688,778 B2
(45) Date of Patent: Jun. 27, 2017

(54) THERMALLY MODIFIED STARCH

(71) Applicant: Nederlandse Organisatie voor Toegepast-Natuurwetenschappelijk Onderzoek TNO, 's-Gravenhage (NL)

(72) Inventors: Maurice Karel Hubertina Essers, 's-Gravenhage (NL); Ricardo Marinus Albertus Nagtegaal, 's-Gravenhage (NL); Florian Hübner, 's-Gravenhage (NL); Katleen Jozefien Rafaela Vallons, 's-Gravenhage (NL)

(73) Assignee: Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 2 days.

(21) Appl. No.: 14/780,059

(22) PCT Filed: Mar. 27, 2014

(86) PCT No.: PCT/NL2014/050191
§ 371 (c)(1),
(2) Date: Sep. 25, 2015

(87) PCT Pub. No.: WO2014/158022
PCT Pub. Date: Oct. 2, 2014

(65) Prior Publication Data
US 2016/0053027 A1 Feb. 25, 2016

(30) Foreign Application Priority Data
Mar. 27, 2013 (EP) ..................................... 13161413

(51) Int. Cl.
*C08B 30/12* (2006.01)
(52) U.S. Cl.
CPC ................................. *C08B 30/12* (2013.01)

(58) Field of Classification Search
None
See application file for complete search history.

(56) References Cited

U.S. PATENT DOCUMENTS

| | | | |
|---|---|---|---|
| 3,977,897 A * | 8/1976 | Wurzburg | ............... C08B 30/12 127/32 |
| 5,641,349 A | 6/1997 | Koubek et al. | |
| 6,010,574 A | 1/2000 | Jeffcoat et al. | |
| 6,221,420 B1 | 4/2001 | Thomas et al. | |
| 6,451,121 B2 * | 9/2002 | Chiu | ..................... A21D 2/186 127/29 |
| 2001/0017133 A1 | 8/2001 | Chiu et al. | |

FOREIGN PATENT DOCUMENTS

| | | |
|---|---|---|
| EP | 0 721 471 A1 | 7/1996 |
| EP | 1 799 719 B1 | 6/2007 |
| WO | WO-2013/173161 A1 | 11/2013 |

OTHER PUBLICATIONS

International Search Report issued in International Patent Application No. PCT/NL2014/050191 mailed May 19, 2014.

* cited by examiner

*Primary Examiner* — Melvin C Mayes
*Assistant Examiner* — Stefanie Cohen
(74) *Attorney, Agent, or Firm* — Sunit Talapatra; Foley & Lardner LLP

(57) ABSTRACT

A process for producing thermally inhibited starch is described resulting in a visco-stable starch product with improved whiteness. The process comprises pretreating a dry starch with an alkaline solution in a water-miscible solvent, adjusting the water content of the starch to below 12 wt. %, heating the starch at a temperature between 140 and 190° C., preferably between 140 and 180° C., and cooling and optionally further processing the starch. The thermally inhibited starch has the advantages of not being chemically modified. The process is more flexible and faster than conventional inhibition processes.

20 Claims, No Drawings

THERMALLY MODIFIED STARCH

CROSS-REFERENCE TO RELATED APPLICATIONS

This application is the National Phase of International Patent Application No. PCT/NL2014/050191, filed Mar. 27, 2014, published on Oct. 2, 2014 as WO 2014/158022 A1, which claims priority to European Patent Application No. 13161413.3, filed Mar. 27, 2013. The contents of which are herein incorporated by reference in its entirety.

FIELD OF THE INVENTION

The invention relates to the production of thermally modified starch, which is a starch having stable viscosity behaviour as a result of a thermal treatment. Such thermally modified starches find use in food applications.

BACKGROUND

Starch is extensively used in the food industry, not only for its energy content (carbohydrates), but also as a thickening or stabilising agent. Native starches, however, require pre-treatment in order to have the required thickening and similar properties in situ. Starches modified by chemical crosslinking, such as phosphate crosslinking, have the required in situ properties, such as shear, acid and heat resistance. However, consumers more and more demand the use of chemical-free ingredients in food, even though some chemical modifications are regarded as safe.

U.S. Pat. No. 6,221,420 (EP0721471) discloses a thermally inhibited starch, i.e. a hydrothermally modified starch which is inhibited from returning to its native state. The product is obtained by dehydrating starch to a water level below 1%, followed by heat-treating the dry starch at about 140° C., in a fluidised bed. U.S. Pat. No. 5,641,349 and U.S. Pat. No. 6,010,574 disclose similarly. Alcohol may be used to aid drying, but otherwise does not play any active role in the inhibition process.

EP 1799719 discloses a process for producing resistant starch by acidifying starch at 3% moisture to a pH 2.3 in the presence of about 4% of ethanol followed by heating at 140° C. This treatment is reported to result in 57% resistant starch. Lower and higher levels of ethanol result in a lower yields of resistant starch.

Thus, there is a need for providing hydrothermally modified starches with improved visco-stability and for processes for producing them in a more economical way, especially where equipment requirements are concerned.

DESCRIPTION OF THE INVENTION

It was found according to the invention that a process for producing thermally inhibited starch by heating an alkalinised starch between 120 and 190° C. in the presence of water, results in a visco-stable product suitable e.g. as a thickener or stabiliser. The starch is alkalinised by adding a solution of an alkali in a water-miscible organic solvent such as ethanol, preferably aqueous ethanol. The process can be performed in traditional equipment, not requiring fluidised beds or the like. With the process of the invention the skilled person is no longer limited to intricate fluidized bed technology needed to commercialize the conventional processes as explained in the background to the invention. Also, the process according to the invention is faster and less prone to upscaling issues. Also the use of additives such as surfactants during heat treatment is not necessary and preferably avoided. The process allows shorter heating periods and results in less coloration of the products than found in a process without addition of alkali in the presence of the water-miscible solvent. All of these advantages have been elucidated in the experimental evidence further below, including comparative examples showing the benefits of the process of the invention over conventional fluidized bed processes without alkali-solvent treatment.

Thus, the invention pertains to a process for producing thermally inhibited starch comprising the steps of:
 (i) providing starch having a water content below 10 wt. % on dry starch basis;
 (ii) adding an alkaline solution of a water-miscible organic solvent, the organic solvent having a boiling point which is lower than the boiling point of water; the amount of water-miscible organic solvent being at least 1 wt. % on dry starch basis, the amount of alkali being 0.0005-0.5 meq per g dry starch and the resulting amount of water being below 12 wt. % on dry starch basis;
 (iii) heating the starch between 140 and 190° C.;
 (iv) cooling and optionally further processing the starch.

The starch to be used in the process of the invention can be any common type of starch, including maize, potato, tapioca, rice, wheat, etc. starch. The starch may contain at least e.g. 70% (w/w) of amylopectin. The starch may be pre-gelatinised, but preferably the starch is native, i.e. not pregelatinised. The starch may be derivatised, e.g. acylated (acetylated or other), hydroxylalkylated (hydroxypropylated or other), alkylated (methylated or other), octenyl-succinylated, slightly oxidized (to produce aldehyde and/or carboxyl groups), or a combination of these derivations. However, non-derivatised starches are preferred as thermally inhibited starches.

The starting water content of the starch in step (i) of the process of the invention is typically below 10 wt. %, preferably below 6 wt. %, more preferably below 4 wt. %, most preferably below 2 wt. %, on dry starch weight basis.

An important feature of the process of the invention is the use of a water-miscible solvent. Suitable water-miscible solvents include lower alcohols, wherein "lower" means having from 1 to 4 carbon atoms. Suitable examples included methanol, ethanol, methoxyethanol, propanol, isopropanol and isomeric butanols. Preferably the water-miscible organic solvent has a boiling point which does not exceed the boiling point of water. For food purposes; the solvent is preferably food-grade. Most preferred are $C_1$-$C_4$ alcohols, preferably $C_1$-$C_3$ alcohols, especially ethanol and isopropanol, most particularly ethanol. The solvent can advantageously be recovered during the process. In fact, it will preferably be allowed for the solvent to evaporate before or during the initial stages of the inhibition (iii).

The amount of water-miscible organic solvent to be used in step (ii) is typically between 1 and 150 wt. %, based on dry starch weight. Higher amounts do not negatively affect the end result, but do not provide additional advantages to compensate for the increased amount of chemicals used. The amount of organic solvent is preferably at least 3 wt. %, more preferably between 5 and 120 wt. %. Especially preferred ranges are between 10 and 75 wt. %, and most preferred between 15 and 50 wt. %, on dry starch basis.

Preferably the alkaline solution to be used in step (ii) contains any hydroxide or alkoxide or compound of comparable alkalinity which is soluble or at least readily dispersible in the water-miscible solvent, in particular in ethanol, or in an aqueous form thereof. Preferred are alkali metal and alkaline earth metal hydroxides or alcoholates (e.g. ethanolates), such as Li, Na, K, Rb, Cs, Mg, or Ca hydroxide or alkoxide. More preferred are sodium or potassium hydroxide. The amount of alkali dissolved in the water-miscible solvent is preferably between 0.001 and 0.5 meq per g dry starch, which corresponds to 0.001-0.5 mmol per g dry starch in case of alkali metal hydroxides or alkoxides. More preferred amounts of alkali are 0.01-0.1 meq per g dry starch.

The alkaline solution may also contain water, if desired for increasing the solubility of the alkali in the water-miscible solvent. It is preferred that the solution contains less than 60 wt. % of water (=less than 54 vol. % of water), more preferably less than 40 wt. % (less than 35 vol. %) of water. Most preferably, the alkaline solution contains between 1 and 30 wt. % (1.2-25 vol. %) of water, in particular between 3 and 15 wt. % (2.5-12 vol. %) of water. The amount of water that is formally generated by reaction of alkali (hydroxide ions) with the alcohol (to form alkoxides) is not counted within the amount of water of the alcohol solution. The alkaline solution may be prepared by dissolving solid alkali in the (aqueous or anhydrous) organic solvent, but more conveniently it is prepared by adding a concentrated aqueous alkaline solution (e.g. 1 M NaOH) in the organic solvent. A particularly advantageous manner of adding the alkaline solution is spraying the solution onto the starch, which allows effective distribution using relatively low volumes of the solution.

In practice, the starch, when treated with the alkaline solution, will always contain at least minor amounts of water, which are believed to be pertinent for the inhibition process. It is preferred that the starch, at the end of step (ii), i.e. when entering the inhibition process (step (iii)), contains at least 0.1 wt. % of water. The amount of water can be adjusted depending on the alkali content and the temperature. The total amount of water in the pre-treated starch, prior to heat treatment, should be below 12 wt. % on dry starch basis, or rather less than 10 wt. %, preferably less than 8 wt. %, more preferably less than 4 wt. %, most preferably between 0.2 and 2 wt. %.

After the pre-treatment, the starch is allowed to react with water under alkaline conditions at high temperature for a sufficient time to initiate the inhibition (cross-linking) process, while avoiding depolymerisation. Without wishing to be bound to a specific theory, the inventors believe that the initiation of cross-linking results in the production of acidic moieties, resulting in a pH drop. This pH drop should preferably occur under alkaline conditions so as to prevent or reduce acid-catalysed degradation processes. The inventors believe that optimum conditions are provided by using a new combination of the amount of alkali, water and the use of the solvent; the inventors furthermore believe that water plays a role in the mechanism of inhibition and that the combination of the solvent and alkali results in optimum conditions for the inhibition reaction.

The heat treatment is performed at a temperature between 140 and 190° C. The minimum temperature is preferably at least 150° C. The maximum is preferably not above 180° C., most preferably it is 170° C. or lower. The optimum temperature can be chosen in conjunction with the reaction time as discussed below.

The length of the heat treatment depends on the treatment conditions and equipment. The total heat treatment of step (iii) may range from a minute to several hours, for example from 15 minutes to 6 hours, preferably from 30 minutes to 3 hours. For example, at a temperature of 140° C., the minimum time for step (iii), i.e. until a sufficient pH decrease has taken place, will be 30 minutes, preferably at least 45 minutes, up to e.g. 4 hours, while at 160° it may be 15 minutes, more preferably at least 30 minutes, up to e.g. 2.5 hours. The shorter process times are a particular advantage of the present invention. Steps (ii) and (iv) may be performed at different temperatures or at different other conditions such as pressure.

The heat treatment in step (iii) is continued until viscostability has been achieved, in particular in combination with a high viscosity during the holding period and a high final viscosity. Viscostability is indicative of the required degree of inhibition (cross-linking). Viscostability is defined according to the invention as the property that the viscosity of the starch which, when reaching a peak viscosity by being heated to 90° C., does not substantially decrease after the peak when the starch is held at 90° C. and subsequently cooled. In general, heating starch (up to e.g. 90° C.) results in a viscosity increase until a maximum value is attained (peak viscosity, PV), after which a drop (breakdown viscosity, BV) may occur until a trough (trough viscosity, TV=PV−BV) is reached; upon cooling, the viscosity may rise (setback viscosity: SV), until a final value (final viscosity, FV=TV+SV) is achieved. In other words, viscostability is achieved when $[BV/PV] \times 100 = [(PV-TV)/PV] \times 100 = $ zero.

As used herein, viscosity is measured using a Micro Visco-Amylo-Graph of Brabender GmbH & Co. (DE) at a defined concentration in water, which, for waxy maize, is 5.8 wt. % in the present invention. Furthermore, peak viscosity as a reference for the viscosity during the holding period is the peak viscosity of native starch of the same origin using the same heating treatment (90° C. followed by holding and cooling), at the same concentration.

Hitherto, the prior art has not been successful in producing a non-chemically modified starch having the combination of viscostability and viscosity properties, especially a high viscosity during the holding phase and the setback viscosity, of chemically crosslinked starch (for example modified by sodium trimetaphosphate (SMTP) or phosphoryl chloride). Chemically crosslinked starch has the ability to be visco-stable, during the holding phase after pasting the starch, at higher viscosity levels, comparable to the level of the peak viscosity of the native starch. The process of the invention allows these characteristics to match, but conveniently without the need for chemical crosslinkers and with reduced process times.

It is preferred that the initial pH, i.e. the pH at the start of step (iii), is between 9 and 10.5. It is furthermore preferred that the pH during step (iii) does not decrease below 6, more preferably it is in the range of 7-8 at the end of the reaction of step (iii).

It was found to be advantageous if at least the first part of the heat treatment is carried out with active removal of water vapour. This can be achieved by using a reactor having a forced circulation, for example using an air blower, or by using sub-atmospheric pressures, e.g. below 0.2 bar (vacuum). An alternative embodiment involves the use of super-heated steam for heat-treating the starch.

The process of the invention results in a thermally inhibited starch which has an increased and stable viscosity compared to native starch, as a result of crosslinking of the starch. Viscostability during the hold phase is at least 80%, preferably at least 90%, especially at least 95% of the peak viscosity of the corresponding native starch. In other words, the viscostability index is less than 20, preferably less than 10, more preferably less than 5%, particularly about zero (<2%). Compared to the final viscosity of the corresponding native starch, the final viscosity of the modified starches obtained by the process of the invention is at least 180%, preferably at least 190%. For example, where native waxy maize starch has a peak viscosity of 600 mPas, and a final viscosity of 480 mPas, as measured in gelatinisation (pasting) test using the standard Brabender Micro Visco-AmyloGraph at 5.8 wt. % starch in water (90° C., 25° C.), the final viscosity of the modified starches of the invention is at least 840 mPas, preferably at least 900 mPas, more preferably at least 960 mPas, etc.

After the heat treatment (step (iii)), the process of the invention can further comprise a step (iv) of washing and drying the heat-treated starch. Other post-treatments can include pH adjustment or mixing with other ingredients.

The process of the invention can be carried out in conventional equipment, such as a dextriniser, oven, plate dryer, Loedige mixer, or paddle reactor, preferably in combination with water-removing means, such as a blower or a vacuum device. Use of more complex equipment such as fluidized bed reactors is therefore not preferred. The large spectrum of equipment and shortened reaction times which can be used with the process of the invention allows for scaling up the process readily, in contrast with the conventional process which makes use of fluidized bed technology and takes extended reaction times.

The thermally modified (or inhibited, or moderately cross-linked) starches can suitably be used in applications in which increased and stable viscosities are required. Thus, the starch can be used as a thickener or for providing a pulpy texture to food products. The starches can be used in soups, gravies, sauces, fruit filling, puddings, baby foods and deep fried foods. The starches produced according to the invention have the important advantage of not being chemically modified, and therefore having broader acceptability, both legally and in consumer acceptance.

The invention also pertains to the use of the hydrothermally treated starches as described herein as a food additive, such as thickeners and stabilisers, e.g. at levels of between 0.1 and 5 wt. % on total dry weight basis of the particular food product. Such food products containing the treated starches as defined herein, are also an embodiment of the invention. In one aspect, the invention pertains to a thermally inhibited starch, which is not chemically modified, and which has a final viscosity of at least 190% of the final viscosity of the corresponding native starch upon said and cooling.

In a preferred embodiment, the starch is colourless, advantageously achieved by limiting the inhibition reaction times as it is made feasible using the process according to the invention. Too long heat treatment of the starch will result in darker (brown) colour due to decomposition and side reactions. In the art, the resulting impurities are difficult to remove due to the fact that they are partially incorporated in the pyrodextrin structure during the treatment. Therefore these starches need to be purified before use in foodstuff. With the process of the invention, a starch product exhibiting excellent viscosity characteristics can be obtained with improved colour properties (i.e. improved whiteness appearance) compared to those obtainable in the art. It thus avoids the need for any subsequent, extensive purification steps to tackle colour issues.

The products of the invention preferably have an increased whiteness (L* value), i.e. for waxy maize starch of at least 90 and for waxy potato starch at least 80 on a scale of 0-100 (as defined e.g. by the CIE, Commission Internationale de l'Eclairage), wherein 100 represents absolute whiteness. It is known in the art that inhibited potato starch suffers from decreased whiteness appearance compared to inhibited maize starch, regardless of the method of inhibition, and any improvement to at least 80 for inhibited potato starch as realized by the inventors would already be appreciated in the art. Whiteness can be determined by comparing UV emissions at a wavelength in the range of 420-720 nm, and are assessed on color scales which are most widely used by the food industry, i.e. the Hunter L,a,b and the CIE L*,a*, b* scales. Here the CIE scales have been selected. A Reflectance Colorimeter of HunterLab (Labscan II 0/45) or whiteness meters available from Kett can be suitably used. The excellent whiteness allows the products of the invention to be used without further purification. In one embodiment, the inhibited starch has a whiteness L* value of at least 90.

In summary, a visco-stable starch with a high viscosity level can be obtained under the following conditions:

Dehydration takes place at temperatures between 120 and 190° C.;

Dehydration is enhanced by using equipment that is capable of effectively removing water (preferably a vacuum system);

Initial pH is between 9-10.5, which is established by treating the (dry, native) starch with an alkaline solution in an organic solvent;

The inhibition (after reaching a substantially anhydrous stage) should preferably take place between 140 and 180° C.; more preferably around 160° C. or even below 160° C.

This is further illustrated by the examples below.

EXAMPLES

Materials

The starches used were kindly provided by AVEBE and Ingredion.
Native starches:
Amioca PWD waxy maize starch (National starch)
Eliane waxy potato starch (AVEBE)

Analytical Methods

The following analytical methods were used:
Moisture content method: Infrared moisture balance (Mettler)
Pasting profile:
Equipment: a Brabender Micro Visco-Amylo-Graph was used. Dependent on the type of starch (corn vs. potato starch) used, the following procedure was followed:

Procedure Neutral Brabender Viscograph Corn Starch 6.38 g of dry starch samples was mixed with 103.62 g of demineralized water in a Brabender cup and placed in the measuring equipment. The Brabender temperature was set at 35° C. and the stirring speed at 250 rpm. Within a time frame of 11 min the temperature was raised to 90° C. This temperature was held for 5 min. Then the starch paste was cooled to 35° C. in 11 min. After 5 min at 35° C. the measurement was completed. The measuring was performed at 235 cmg.

Procedure Neutral Brabender Viscograph Potato Starch 5.5 g of dry starch samples was mixed with 104.5 g of demineralized water in a Brabender cup and placed in the measuring equipment. The Brabender temperature was set at 35° C. and the stirring speed at 250 rpm. Within a time frame of 11 min, the temperature was raised to 90° C. This temperature was held for 5 min. Then the starch paste was cooled to 35° C. in 11 min. After 5 min at 35° C. the measurement was finished. The measuring was performed at 235 cmg.

Breakdown Viscosity.

The breakdown viscosity is defined as follows;

((Peak viscosity−viscosity after 5 minutes)/peak viscosity)*100 pH was measured in a 20% dry solid starch suspension in demineralized water using a pH meter (METHROM).

Examples 1-6: Treatment and Inhibition Process According to the Invention

The inhibition process according to the invention was carried out after pre-treating the starch according to method A or B as specified here below:

Starch Pre-Treatment Method A

First an alkaline ethanol solution was prepared by dissolving 280 mg (7 mmol) NaOH in 200 g ethanol under reflux conditions. The starch (waxy maize) was dried to a moisture level of approximately 2% (Rotavapor, 16 h, at 60° C. under vacuum). 12.5 g of the alkaline ethanol solution was added to 17.9 g of pre-dried waxy maize starch; the amount of alkali added to the starch results in a pH of approximately 10 when the starch is dispersed in water again.

This pre-treatment method was applied to starch inhibited in experiments 1-3, where an additional amount of water (0.5 to 0.75 g) was added.

Starch Pre-Treatment Method B

First an alkaline ethanol solution was prepared by dissolving 280 mg (7 mmol) NaOH in 200 g ethanol under reflux conditions. 100 g Waxy maize starch was suspended in 500 ml abs. alcohol and refluxed for 3 hours. The suspension was then filtered through a paper filter (Whatman No 4, Whatman International, England) and the starch was recovered in the filter cake. The cake was dried for 2 hours at 60° C. in a convection oven (Memmert, Germany). Then the final moisture level was determined (IR balance). 12.5 g of the alkaline ethanol solution was added to 17.5 g of pre-dried waxy maize (moisture level 0%).

This pre-treatment method was applied to starch then inhibited in examples 4-6.

Inhibition Process

The alkalinised starch obtained in the pre-treatment according to the above method A or B was placed in a dish in an oven at 165° C. or 150° C. for a specified period of time. The inhibition reaction was stopped by removing the sample out of the oven and allowing the starch to cool down to room temperature. The starch was analysed in an MVA/Brabender at 5.8% as described above.

TABLE 1

Process variables (invention)

| Example Method A/B | amount of starch (g) | amount of ethanol (ml) | amount (µmol) of NaOH | amount (g) of water added | perc. water on starch | pH after pre-treatment (initial pH) | reaction temp. (° C.) | reaction time (min) |
|---|---|---|---|---|---|---|---|---|
| 1 (A) | 17.5 | 12.5 | 437 | 0.5 | 5% | 10 | 165 | 45 |
| 2 (A) | 17.5 | 12.5 | 437 | 0.5 | 5% | 10 | 165 | 60 |
| 3 (A) | 17.5 | 12.5 | 437 | 0.75 | 6.5% | 10 | 165 | 60 |
| 4 (B) | 17.5 | 12.5 | 437 | 0 | <1% | 10 | 165 | 60 |
| 5 (B) | 17.5 | 12.5 | 437 | 0 | <1% | 10 | 165 | 45 |
| 6 (B) | 17.5 | 12.5 | 437 | 0 | <1% | 10 | 150 | 60 |

Table 1 below shows the variables of the various experiments.

Results

Table 2 shows the results. It follows that visco-stability (no breakdown viscosity) is achieved by a suitable combination of reaction temperature and reaction time under the conditions used (Example 2, 3 and 4). The final viscosity furthermore depends on the amount of water, in addition to the reaction temperature and the reaction time. When comparing the results with a process not involving the use of an organic solvent (ethanol) as shown in Examples 7-11, Tables 3-4, it follows that visco-stability in combination with a high final viscosity is obtained by the use of an alkali in a water-miscible organic solvent, especially at low water levels (Example 4).

TABLE 2

Viscosity data and pH after inhibition (invention)

| Example Method A/B | % breakdown viscosity * | viscosity during holding phase# (mPa · s) | ratio viscosity holding phase to peak viscosity (%) ## | final viscosity mPas | pH after inhibition | L* value |
|---|---|---|---|---|---|---|
| control waxy maize | 50 | | | 480 | — | |
| 1 (A) | 10 | — | | 800 | 9.1 | |
| 2 (A) | 0 | 450 | 75 | 690 | 7.8 | |
| 3 (A) | 0 | 500 | 83 | 690 | 7.9 | |
| 4 (B) | 0 | 570 | 95 | 1000 | 8.1 | 90 |

TABLE 2-continued

Viscosity data and pH after inhibition (invention)

| Example Method A/B | % breakdown viscosity * | viscosity during holding phase# (mPa·s) | ratio viscosity holding phase to peak viscosity (%) ## | final viscosity mPas | pH after inhibition | L* value ~ |
|---|---|---|---|---|---|---|
| 5 (B) | 11 | — | | 1100 | 8.5 | |
| 6 (B) | 18 | — | | 800 | 9.2 | |

*: a value of 0 (zero) means visco-stability (no breakdown after maximum is reached);
: no data means no complete visco-stability reached yet;
: the peak viscosity of waxy maize starch, which is 600 mPas using the Brabender procedure;
~: The L* value is a expression of lightness scaled between 0 (black) and 100 (white).

Examples 7-11: Treatment and Inhibition Process (Comparative)

Pre-Treatment of the Starch:

Starch (waxy maize) was suspended in water (100 g of starch in 400 mL of water) under constant stirring with a magnetic stirrer. A NaOH solution (0.1 mol/L) was used to adjust the pH to the required level (pH 10) within 15 min. After 1 h of stirring, the pH was measured again and adjusted, if necessary. The suspension was then filtered through a paper filter (Whatman No 4, Whatman International, England) and the starch was recovered in the filter cake. The cake was dried over night at 60° C. in a convection oven (Memmert, Germany). The dried cake was milled using a coffee grinder (Type F203, Krups, Germany). The resulting starch was subsequently reconditioned to the desired water content in open air at standard temperature.

TABLE 3

Process variables (comparative)

| Example | amount of starch (g) | initial moisture level (%) | initial pH | reaction temperature (° C.) | reaction time (min) |
|---|---|---|---|---|---|
| 7 | 17.5 | 1 | 10 | 165 | 120 |
| 8 | 17.5 | 1 | 10 | 165 | 180 |
| 9 | 17.5 | 5 | 10 | 165 | 60 |
| 10 | 17.5 | 5 | 10 | 165 | 120 |
| 11 | 17.5 | 10 | 10 | 165 | 120 |

TABLE 4

Viscosity data and pH after inhibition (comparative)

| Example | % breakdown viscosity * | peak viscosity (mPas) | viscosity during holding phase (mPas) # | final viscosity mPas | pH after inhibition | L* value ~ |
|---|---|---|---|---|---|---|
| control (waxy maize) | 50 | 600 | — | 480 | — | |
| 7 | 17 | 630 | — | 900 | 8.5 | |
| 8 | 0 | | 450 | 900 | 7.3 | 85 |
| 9 | 24 | 540 | — | 700 | 9 | |
| 10 | 0 | | 580 | 1000 | 8.3 | |
| 11 | 0 | | 500 | 900 | 7.5 | |

*: a value of 0 (zero) means viscostability (no breakdown after maximum is reached);
: no data means no complete viscostability reached yet;
~: L* value is a expression of lightness scaled between 0 (black) and 100 (white).

Inhibition Process (Comparative Example)

17.5 g of starch (calculated on dry substance) obtained in the above pre-treatment was placed in a dish in an oven at 165° C. for a specified period of time. The inhibition reaction was stopped by removing the sample out of the oven and allowing the starch to cool down to room temperature. The starch was analysed in an MVA/Brabender at 5.8% as described above. The reaction variables are summarised in Table 3 below. The results are shown in Table 4 below.

In order to obtain visco-stability (breakdown viscosity of zero), at least 2 hours reaction time was needed in a conventional inhibition process without the use of alkali-solvent. In comparison, the alkali-solvent system according to the invention (Table 2) only required 1 hour reaction time in order to obtain a visco-stable product. The end viscosity also turned out to be higher than if the visco-stable product was made via the conventional process. Further, the starch inhibited of the process according to the invention was found less prone to colour formation than starch prepared using the conventional process (compare the L-values reported in experiments 4 and 8). With the process of the invention, a product was obtained with excellent white appearance (L* value of 90), while the conventional process could yield a product with the same viscosity characteristics only at the price of a reduced white appearance, i.e. L* value of 85.

Examples 12-15: Effect of the Amount of Starch in Inhibition Process (Comparative)

In the experiments summarized in Table 5 we have investigated the influence of the amount of starch that is processed. Experiment 12B and 13B is carried out according to the recipe described for examples 1-6, and the details of experiment 14 and 15 are following the details for examples 7-11, according to the conventional state of the art technology (without alkali-solvent).

TABLE 5

Process variables scaling up waxy corn starch (invention and comparative)

| Example (pretreatment method A/B) | amount of starch (g) | amount of ethanol (ml) | amount (μmol) of NaOH | amount (g) of water added | perc. water on starch | pH after pretreatment (initial pH) | reaction temp. (° C.) | reaction time (min) |
|---|---|---|---|---|---|---|---|---|
| 12 B | 87.5 | 62.5 | 2185 | 0 | <1% | 10 | 165 | 60 |
| 13 B | 175 | 125 | 4370 | 0 | <1% | 10 | 165 | 60 |
| 14 | 175 | | | | <1% | 10 | 165 | 180 |
| 15 | 175 | | | | <1% | 10 | 165 | 180 |

Table 6 displays the results of experiment 12-15.

TABLE 6

Viscosity data and pH after inhibition (invention & comparative; scaling up)

| Example (pretreatment method A/B) | % breakdown viscosity * | viscosity during holding phase (mPas) # | ratio viscosity holding phase to peak viscosity (%) ## | final viscosity (mPas) | pH after inhibition |
|---|---|---|---|---|---|
| 12 (B) | 0 | 570 | 95 | 1100 | 8.1 |
| 13 (B) | 0 | 570 | 95 | 1100 | 8.1 |
| 14 | 16 | | | 900 | 7.1 |
| 15 | 0 | 450 | 75 | 1000 | 6.5 |

According to the results of experiments 4, 12 and 13 it is concluded that the process variables of the invention are less sensitive for scaling up than in the conventional system in the art (see experiments 7, 14 and 15). Clearly, the conventional process involved longer reaction times to obtain the same viscosity characteristics, such as breakdown viscosity (%) and the final viscosity, when larger amounts of starch are processed. However, as a consequence of the extended reaction times, the product yielded exhibited decreased whiteness.

Examples 16-19: Inhibition of Waxy Potato Starch

Waxy Potato Starch (Eliane)

TABLE 7

Process variables waxy potato starch (Eliane) (invention & comparative)

| Example Procedure A/B | amount of starch (g) | amount of ethanol (ml) | amount (μmol) of NaOH | amount (g) of water added | perc. water on starch | pH after pretreatment (initial pH) | reaction temp. (° C.) | reaction time (min) |
|---|---|---|---|---|---|---|---|---|
| 16 | 17.5 | — | — | — | 10 | 11 | 165 | 180 min |
| 17 B | 17.5 | 12.5 | 437 | 0.18 | 1 | 11 | 165 | 135 min |
| 18 B | 17.5 | 12.5 | 437 | 0.9 | 5 | 11 | 165 | 135 min |
| 19 B | 17.5 | 12.5 | 437 | 1.8 | 10 | 11 | 165 | 135 min |

First 240 mg NaOH was dissolved in 142 g ethanol under reflux conditions. 12.5 g of the alkaline ethanol solution was added to 17.9 g of pre-dried waxy potato starch (using pre-treatment method A or B as described above). In experiments 16-19, an additional amount of water (0.5 to 0.75 g) was added.

Experiment 16 is about the inhibition of waxy potato starch via the conventional process whereas 17-19 are made via the new process.

TABLE 8

Process variables waxy potato starch (Eliane) (invention)

| Example | % breakdown viscosity * | viscosity during holding phase (mPas) # | pH after inhibition | L* |
|---|---|---|---|---|
| 16 | 0 | 1050 | 7 | 75 |
| 17 B | 23 | | 7.7 | |
| 18 B | 4.5 | | 7.5 | |
| 19 B | 0 | 1025 | 7.2 | 84 |

* a value of 0 (zero) means visco-stability (no breakdown after maximum is reached)
: no data means no complete visco-stability reached yet.

The L-value is a expression of lightness scaled between 0 (black) and 100 (white). By use of the new process, visco-stable inhibited starches can be made in shorter reaction times, resulting in a reduction in colour formation.

Even with waxy potato starch, the same trends in reaction times were observed. Potato starch is known for inhibition reaction times that extend for longer times compared to maize starch, yet with the process of the invention the reaction times could be shortened compared to potato starch subjected to the conventional process.

The invention claimed is:

1. A process for producing thermally inhibited starch, comprising:
   (i) adding to starch having a water content below 10 wt. % on dry starch basis an alkaline solution of a water-miscible organic solvent having a boiling point lower than the boiling point of water; the amount of water-miscible organic solvent being at least 1 wt. % on dry starch basis, the amount of alkali being 0.001-0.5 meq per g dry starch and the resulting amount of water being less than 12 wt. % on dry starch basis;
   (ii) heating the starch between 120 and 190° C.; and, optionally,
   (iii) cooling and further processing the starch.

2. The process according to claim 1, wherein in step (i) the water content of the starch is below 6 wt. %.

3. The process according to claim 2, wherein in step (i) the water content of the starch is below 2 wt. %.

4. The process according to claim 1, wherein the resulting amount of water is less than 8 wt. %.

5. The process according to claim 4, wherein the resulting amount of water is less than 4 wt. %.

6. The process according to claim 5, wherein the resulting amount of water is between 0.2 and 2 wt. %.

7. The process according to claim 1, wherein the amount of water-miscible organic solvent is between 3 and 120, and/or the amount of alkali is 0.005-0.1 meq per g dry starch.

8. The process according to claim 1, wherein the amount of water-miscible organic solvent is between 5 and 50, and/or the amount of alkali is 0.005-0.1 meq per g dry starch.

9. The process according to claim 1, wherein the water-miscible solvent is a C1-C4 alcohol.

10. The process according to claim 9, wherein the alcohol is selected from the group consisting of methanol, ethanol, isopropanol, and propanol.

11. The process according to claim 1, wherein the starch is heated to between 120 and 180° C.

12. The process according to claim 1, wherein the starch is heated between 0.5 and 3 hours.

13. The process according to claim 1, wherein the heating is performed with forced water removal.

14. The process according to claim 13, wherein the forced water removal is accomplished with a vacuum or an air blower.

15. The process according to claim 1, wherein the inhibited starch, upon heating at 90° C. and subsequent holding at 90° C., has a viscosity during holding of least 80%, of the peak viscosity of the corresponding native starch upon the heating.

16. The process according to claim 1, further comprising washing and drying the heat-treated starch.

17. The process according to claim 1, which is carried out in a dextrinizer, oven, plate dryer, Loedige mixer, or paddle reactor, optionally combined with a water-removing means.

18. The process according to claim 1, wherein the starch is heated below 160° C.

19. A thermally inhibited starch, which is not chemically modified, which has a final viscosity of at least 190% of the final viscosity of the corresponding native starch, and being (i) a waxy maize starch having a whiteness appearance characterized by an L*-value of at least 90; or (ii) waxy potato starch having a whiteness appearance characterized by an L* value of at least 80.

20. The process according to claim 1, wherein the starch is heated to between 140 and 190° C.

* * * * *